United States Patent
Desbiolles

(10) Patent No.: US 7,249,527 B2
(45) Date of Patent: Jul. 31, 2007

(54) SYSTEM FOR SENSING ABSOLUTE TORQUE AND A MODULE COMPRISING IT

(75) Inventor: Pascal Desbiolles, Thorens-Glieres (FR)

(73) Assignee: S.N.R. Roulements, Annecy Cedex (FR)

( * ) Notice: Subject to any disclaimer, the term of this patent is extended or adjusted under 35 U.S.C. 154(b) by 0 days.

(21) Appl. No.: 10/984,835

(22) Filed: Nov. 10, 2004

(65) Prior Publication Data
US 2005/0103125 A1   May 19, 2005

(30) Foreign Application Priority Data
Nov. 18, 2003  (FR) .................................. 03 50855

(51) Int. Cl.
*G01L 3/10* (2006.01)
(52) U.S. Cl. ............................. 73/862.321; 73/862.332
(58) Field of Classification Search ........... 73/862.321, 73/862.332
See application file for complete search history.

(56) References Cited

U.S. PATENT DOCUMENTS

| | | | | |
|---|---|---|---|---|
| 4,599,561 A * | 7/1986 | Takahashi et al. | ..... | 324/207.12 |
| 5,195,382 A * | 3/1993 | Peilloud | ................ | 73/862.321 |
| 5,247,839 A * | 9/1993 | Okutani et al. | ......... | 73/862.326 |
| 5,898,301 A | 4/1999 | La Croix et al. | | |
| 5,955,878 A | 9/1999 | Peilloud et al. | | |
| 6,400,143 B1 | 6/2002 | Travostino et al. | | |
| 6,456,913 B1 * | 9/2002 | Nicot et al. | .................... | 701/41 |
| 6,564,653 B2 | 5/2003 | Desbiolles | | |
| 6,573,710 B1 | 6/2003 | Santos et al. | | |
| 6,683,427 B2 * | 1/2004 | Desbiolles et al. | ......... | 318/254 |
| 6,686,713 B2 * | 2/2004 | Desbiolles et al. | ......... | 318/254 |
| 6,741,048 B2 * | 5/2004 | Desbiolles et al. | ......... | 318/254 |
| 6,837,116 B2 * | 1/2005 | Desbiolles | ............. | 73/862.335 |
| 6,859,002 B2 * | 2/2005 | Desbiolles et al. | ......... | 318/254 |
| 6,871,554 B2 * | 3/2005 | Duret et al. | ............ | 73/862.332 |
| 2002/0024336 A1 * | 2/2002 | Desbiolles et al. | .... | 324/207.25 |
| 2002/0050178 A1 * | 5/2002 | Desbiolles | ............. | 73/862.193 |
| 2002/0166389 A1 * | 11/2002 | Desbiolles | ............. | 73/862.325 |
| 2003/0057902 A1 * | 3/2003 | Desbiolles et al. | ......... | 318/254 |
| 2003/0057903 A1 * | 3/2003 | Desbiolles et al. | ......... | 318/254 |
| 2003/0059212 A1 * | 3/2003 | Desbiolles et al. | ......... | 388/804 |

FOREIGN PATENT DOCUMENTS

EP    0 871 014 A1    10/1998

(Continued)

*Primary Examiner*—Edward Lefkowitz
*Assistant Examiner*—Freddie Kirkland, III
(74) *Attorney, Agent, or Firm*—Arent Fox LLP

(57) ABSTRACT

A system for determining the absolute torque applied to a rotating shaft includes a sensitive element that is deformable under torsion and a measuring device having first and second coders that are intended to be rotationally fixed, respectively, in the vicinity of each end of the sensing element. The coders have a singularity or several equally distributed singularities; first and second fixed sensors disposed opposite to and at an air gap which is a predetermined distance from, respectively, the first and second coders, wherein each sensor is able to deliver a signal having a pulse corresponding to the detection of a singularity of the coder. The system also includes a device for processing the signals transmitted by the sensors that is able to calculate the angular difference between the singularities in order to determine, by comparison with a calibration difference, the absolute torque applied.

12 Claims, 2 Drawing Sheets

FOREIGN PATENT DOCUMENTS

| | | |
|---|---|---|
| FR | 2 754 063 | 4/1998 |
| FR | 2 769 087 | 4/1999 |
| FR | 2 769 088 | 4/1999 |
| FR | 2 792 403 | 10/2000 |
| FR | 2 794 504 | 12/2000 |
| FR | 2 816 051 | 5/2002 |
| FR | 2 856 142 | 12/2004 |
| WO | 00/75673 A1 | 12/2000 |
| WO | 2004/111570 A2 | 12/2004 |
| WO | 2004/111577 A2 | 12/2004 |

\* cited by examiner

SYSTEM FOR SENSING ABSOLUTE TORQUE AND A MODULE COMPRISING IT

BACKGROUND OF THE INVENTION

1. Field of the Invention

The invention concerns a system for determining the absolute torque applied to a rotating shaft, in particular the shaft of a vehicle steering column. The invention also concerns a module for measuring the torque applied to the rotating shaft comprising such a system.

2. Description of Related Art

A conventional steering column is composed of a tubular sheath fixed to the bodywork of the vehicle, guiding and supporting a steering shaft. The steering shaft connects the steering wheel to the steered wheels of the vehicle.

In a variant, the invention also applies to decoupled steering systems in which the steering column does not provide a direct mechanical connection between the steering wheel and the wheels. This is because, unlike conventional steering columns, decoupled steering columns are not associated with a steering box converting the circular movement of the steering wheel into an angular movement of the steering arm which causes the wheels to turn.

The torque measurement on the steering shaft is necessary in particular in electrical assisted steering systems since the triggering of the assistance depends in particular on the torque applied by the driver to the steering wheel.

The torque measuring device used in electrical assisted steering systems emits a signal indicating the torque exerted by the driver on the steering wheel and therefore on the vehicle steering shaft.

This signal is conventionally sent to a steering assistance computer which triggers the assistance, controlling for example an electric motor, in the case of electrical assisted steering.

Measurement of the torque applied to the steering wheel can also be used, for example, in simulators in order to provide, in real time, good simulation of driving.

This is because the restoration of forces at the steering wheel by virtue of a mechanism generating a torque on the steering wheel according to the type of vehicle to be simulated, equipped or not with assisted steering, must take account of the running conditions to be recreated.

The invention can also apply to other fields such as that of the transmission of forces, for example to the wheels of a vehicle, or to controlling the braking of the said vehicle by means of measuring the torque applied.

There is known, in particular from the document FR-2 816 051 issuing from the applicant, a device for determining the torque applied to a rotating shaft. Such a device has many advantages and makes it possible in particular to simplify the installation. This is because the use of digital sensors dispenses with any variations in air gap and differences in temperature magnitudes.

This type of device makes it possible to determine the relative or absolute torque applied to a rotating shaft.

Relative torque means the value of the torque at a given moment with respect to an arbitrary torque value taken as a reference. This reference value of the torque may then vary from one measurement to another.

BRIEF SUMMARY OF THE INVENTION

Absolute torque means the value of the torque at a given moment with respect to a reference value delivered by the device under zero torque.

In the context of electrical assisted steering, for example, it may be important to know the absolute torque applied to the steering shaft.

The device of the document FR-2 816 051 makes it possible to determine the absolute torque applied to a rotating shaft by comparing the absolute angular positions of the rotating races of two bearings each associated with one end of a sensing element.

A determination of this type therefore requires firstly measuring the absolute angular positions of the ends of the sensing element in order to derive therefrom the absolute torque applied to the shaft.

However, in certain cases of running, in particular when the device is brought into service, this determination strategy may require a large angular movement of the rotating shaft before knowing the absolute angular position and therefore a relatively long time before being able to determine the absolute torque.

The invention aims to increase the speed of determination of the absolute torque applied to a rotating shaft. To do this, the angular difference between two singularities each placed on one end of a sensing element deforming under the action of a torque is compared with a reference angular difference.

Because of this, the maximum angular difference being determined by design, the absolute torque is obtained after a limited angular movement of the ends of the sensing element. In addition, the number of processing operations necessary for determining the torque is reduced.

In addition, by choosing an appropriate maximum angular difference, the system according to the invention allows better adaptation to its use.

BRIEF DESCRIPTION OF DRAWINGS

To this end, according to a first aspect, the invention proposes a system for determining the absolute torque applied to a rotating shaft, in particular the shaft of a vehicle steering column, the said system comprising a sensing element deformable under torsion under the action of the torque applied to the said shaft and a measuring device comprising:

a first and second coder intended to be rotationally fixed respectively close to each of the ends of the sensing element, the said coders having a singularity or several singularities equally distributed with an angular difference greater than the maximum deformation value in use of the sensing element, the angular distribution of the singularities being identical on the two coders;

a first and second fixed sensor disposed opposite and at an air gap distance respectively from the first and second coder, each of the said sensors being able to deliver a signal having a pulse corresponding to the detection of a singularity of the coder;

the said system also comprising a device for processing the signals issuing from the sensors which, after measurement of a singularity on each coder, is able to calculate the angular difference between the said singularities so as to determine, by comparison with a calibration difference, the absolute torque applied.

According to a second aspect, the invention proposes a module for measuring the torque applied to a rotating shaft, the said module comprising a system as described above and means of associating the said module with respectively two parts of the shaft, the shaft having no sensing element.

According to a third aspect, the invention proposes a module for measuring the torque applied to a rotating shaft, the said module comprising a system as described previously and means for associating the said module with respectively an end of the shaft and the member applying the torque, the said shaft having no sensing element.

Figure 1:
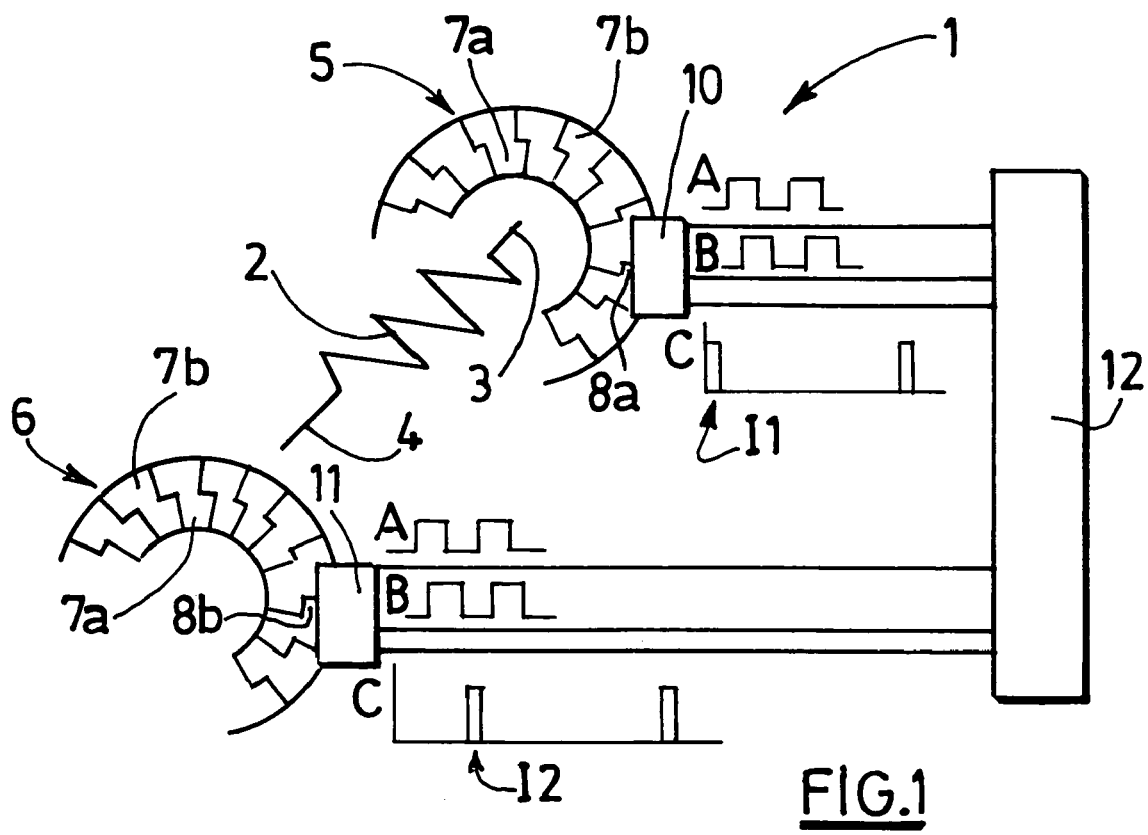
Figure 3:
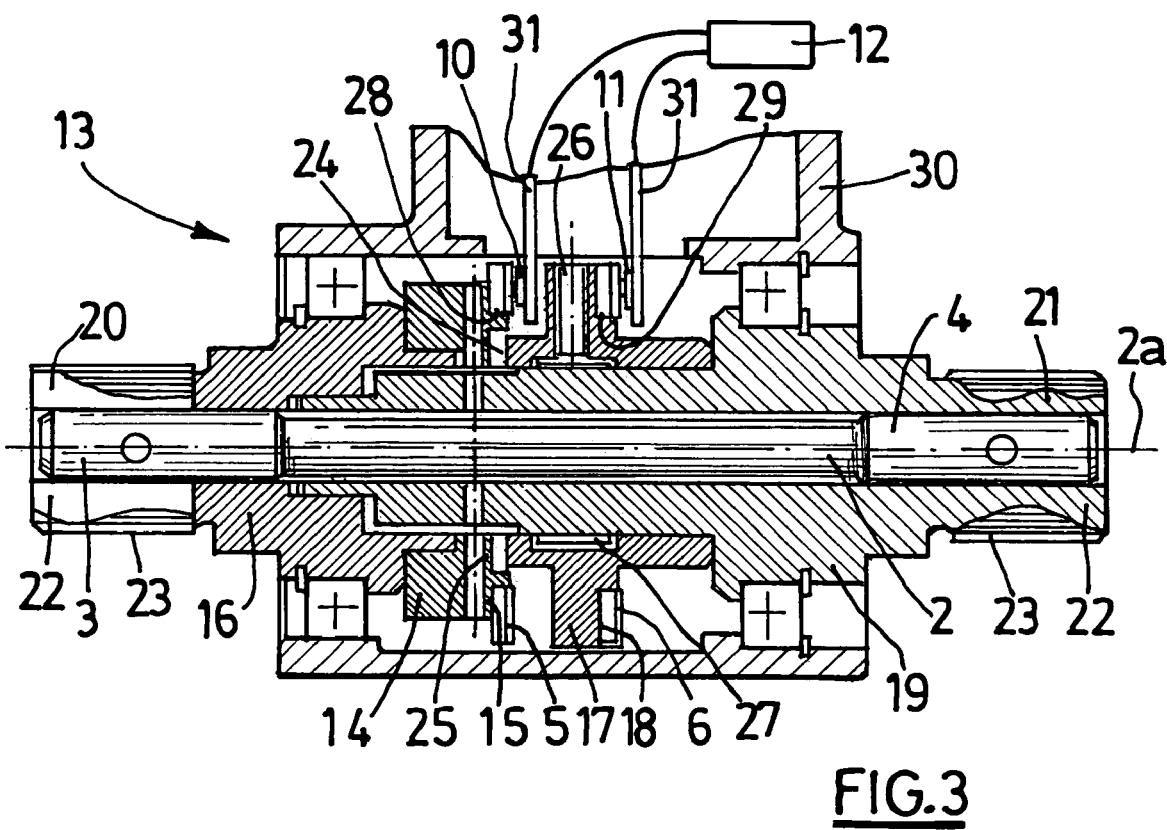
Figure 2A:
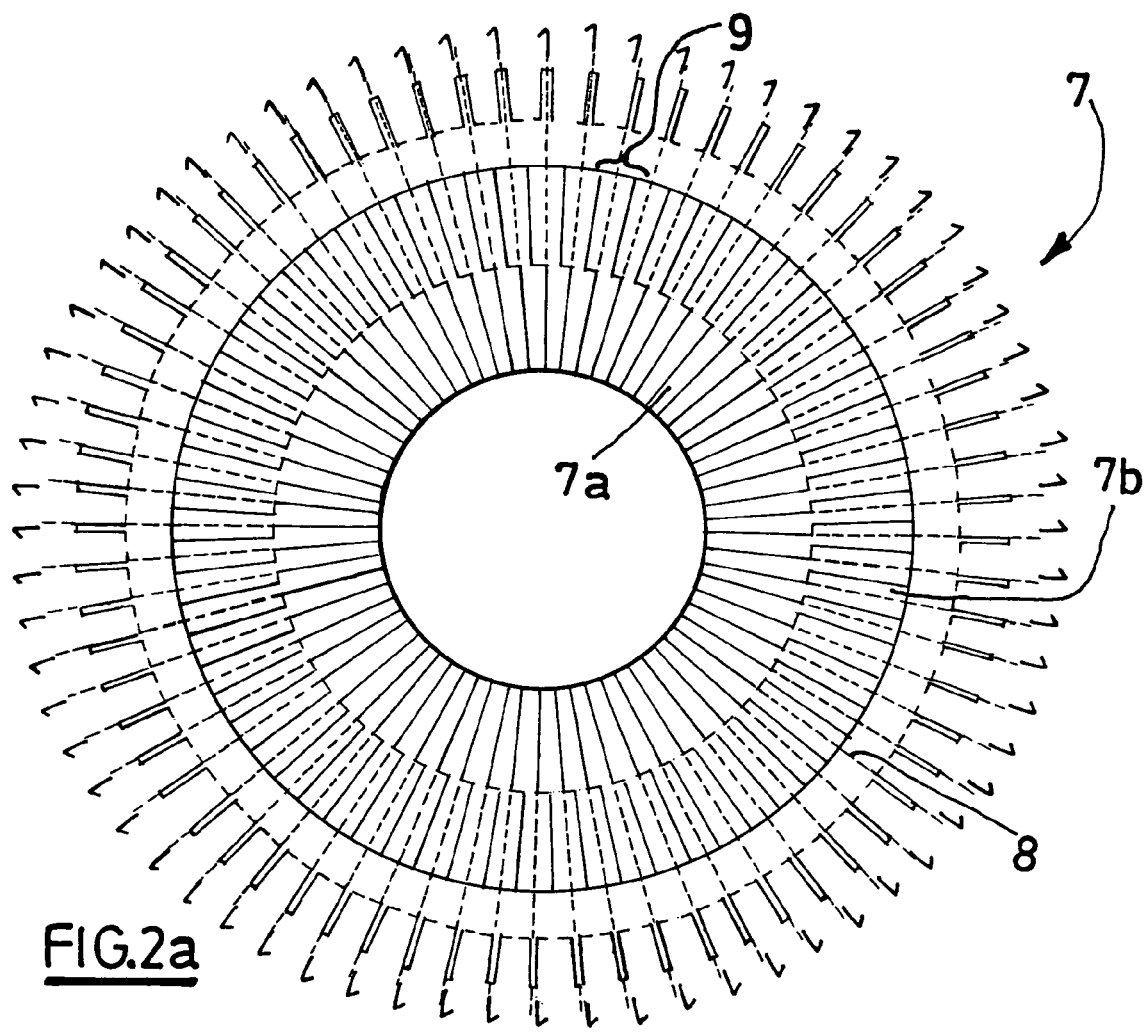
Figure 2B:
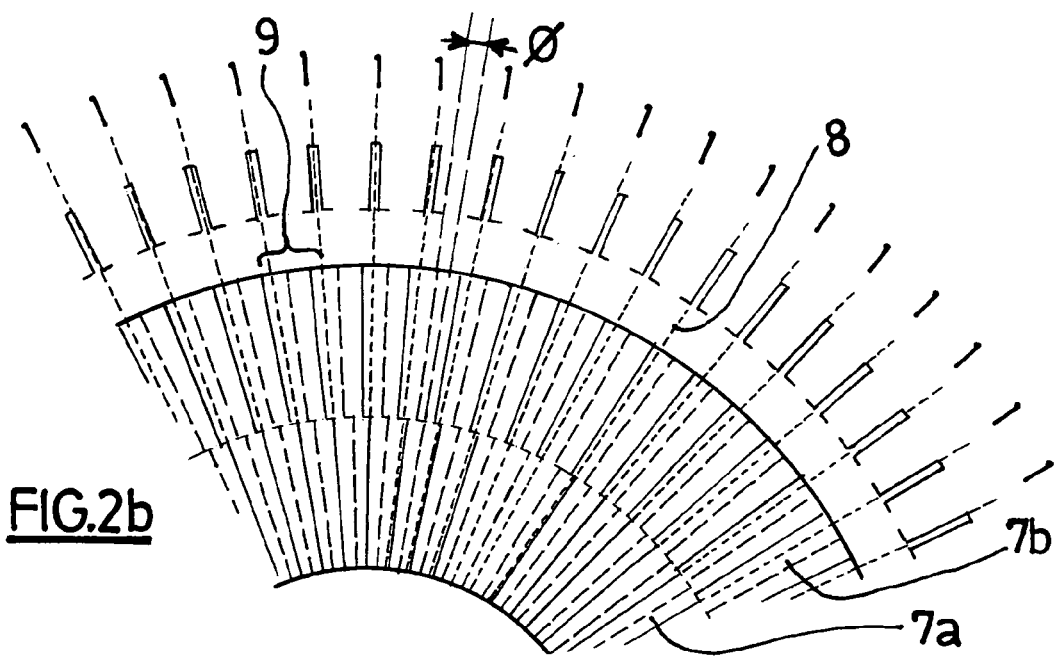

Other objects and advantages of the invention will emerge during the following description, given with reference to the accompanying drawings, in which:

FIG. 1 is a functional diagram of a system for determining the absolute torque applied to a rotating shaft according to the invention;

FIGS. 2a and 2b are front views respectively of a coder and a portion of a coder used in the system according to the invention;

FIG. 3 is a partial view in longitudinal section of a module for measuring the torque applied to a rotating shaft comprising a system according to the invention.

DETAILED DESCRIPTION OF PREFERRED EMBODIMENTS

FIG. 1 depicts a system 1 for determining the absolute torque applied to a rotating shaft of the type comprising a sensing element 2 deformable under torsion under the action of the torque applied to the said shaft.

In a particular example, the rotating shaft is the shaft of the steering column of a vehicle to which a turning torque is exerted by the driver by means of the steering wheel.

When it is wished to know this turning torque, it is known how to provide a sensing element 2 able to transmit the torque applied by deforming elastically under the action of the said torque.

The measurement of the torque exerted can then be sent, in particular in the form of an electrical signal, to a steering assistance computer which triggers the assistance, for example by means of an electric motor in the case of electrical assisted steering.

The sensing element 2 is typically in the form of a torsion bar of reduced diameter compared with that of the shaft since, in terms of isotropic linear elasticity, the torque exerted in pure torsion on a solid cylindrical bar with a circular cross-section varies, for a given material, as a function of the fourth power of the diameter of the bar, at a fixed torsion angle.

Consequently, producing an area with a reduced cross-section makes it possible, under the effect of the torque applied, to concentrate and amplify the torsion deformations on the said area so as to make of it a favoured measurement area for the torque value.

The sensing element 2 has a first 3 and a second end 4 which, under the effect of the torque applied to the shaft, move in rotation conjointly with the shaft but with an angular difference with respect to one another.

It is wished to measure this angular difference in order to determine, by means of a processing device taking account of the nature of the sensing element, the torque applied to the shaft.

To this end, a measuring device is used comprising a first 5 and second 6 coder intended to be rotationally fixed respectively close to the first 3 and second 4 end of the sensing element 2.

FIG. 2 depict an embodiment of the coders 5, 6 used in the measuring device. The coders 5, 6 are formed from a magnetic ring 7 comprising a main multipole track 7a and a so-called rotation pulse multipole track 7b which are concentric. The rotation pulse track 7b of each of the coders 5, 6 has several singularities 8 equally distributed with an angular difference greater than the maximum deformation value in use of the sensing element 2.

The angular distribution of the singularities 8 is identical on the two coders 5, 6.

The main 7a and rotation pulse 7b multipole tracks of each of the coders 5, 6 are formed from a plurality of contiguous poles with a magnetisation direction of a given pole reversed with respect to the two poles which are contiguous with it.

According to the embodiment depicted in FIG. 2, the main track 7a, disposed towards the inside of the ring 7, and rotation pulse track 7b, disposed towards the outside of the ring 7, comprise 68 pairs of poles 9. The pairs of poles 9 of the rotation pulse track 7b are in phase lag by a value $\phi$ with respect to those of the main track 7a.

Each singularity 8 is formed from a pair of poles 9, the width of the poles being arranged so that a pole is out of phase by $-\phi$ with respect to the corresponding pole on the main track 7a.

In the embodiment depicted, the rotation pulse track 7b has one singularity 8 every pair of poles 9, that is to say 68 singularities. For reasons of legibility, only one magnetic transition out of two has been shown in FIG. 2a.

In a variant, not shown, the number of pairs of poles 9 and/or singularities 8 and/or the distribution of the singularities 8 may vary. It is thus possible to provide for the coder 5, 6 to have only one singularity 8.

The measuring device also comprises first 10 and second 11 fixed sensors disposed opposite to and at an air gap distance from respectively the first 5 and second 6 coders.

The sensors 10, 11 comprise at least three sensitive elements, at least two of which are positioned opposite the main track 7a and at least one of which is positioned opposite the rotation pulse track 7b.

In a particular example, the sensitive elements are chosen from amongst Hall effect sensors, magnetoresistors and giant magnetoresistors.

The first 10 and second 11 sensors used are able to deliver two periodic electrical signals S1, S2 in quadrature by means of the sensitive elements disposed opposite the main track 7a and an electrical signal S3 by means of the sensitive elements disposed opposite the rotation pulse track 7b.

The principle of obtaining the signals S1 and S2 from a plurality of aligned sensitive elements is, for example, described in the document FR-2 792 403 issuing from the applicant.

However, sensors 10, 11 comprising two sensitive elements which are able to deliver the signals S2 and S2 are also known.

The first 10 and second 11 sensors each comprise an electronic circuit able, from the electrical signals S1, S2 and S3, to deliver two square digital position signals A, B in quadrature and a rotation pulse signal C in the form of a pulse corresponding to the detection of a singularity 8 on the rotation pulse track 7b.

A principle of obtaining the digital signals A, B and C and various embodiments of the magnetic singularities 8 are described in the documents FR-2 769 088 and EP-0 871 014 issuing from the applicant.

According to one embodiment, each electronic circuit also comprises an interpolator, for example of the type described in the document FR-2 754 063 issuing from the applicant, making it possible to increase the resolution of the digital signals. In particular, a signal comprising 128 edges per pair of poles may be obtained.

Each sensor 10, 11 can be integrated on a silicon substrate or equivalent, for example AsGa, so as to form an integrated circuit personalised for a specific application, a circuit sometimes designated by the term ASIC in order to make reference to the integrated circuit designed partially or completely according to requirements.

Although the description is given in relation to a magnetic sensor/coder assembly, it is also possible to implement the invention in a similar fashion using a technology of the optical type. For example, the coder can be formed from a metal or glass target on which the main and rotation pulse tracks have been etched so as to form an optical pattern similar to the multipole magnetic pattern disclosed above, the sensitive elements then being formed from optical detectors.

The determination system 1 also comprises a device 12 for processing the signals issuing from the sensors 10, 11 which, after measuring a singularity 8 on each coder 5, 6, is able to calculate the angular difference between the said singularities 8 so as to determine, by comparison with a calibration difference, the absolute torque applied to the rotating shaft.

For the correct functioning of the determination system 1, the choices of the stiffness of the torsion bar composing the sensing element 2 and of the distribution of the singularities 8 must be made so that the deformation of the sensing element 2 under the action of the torque does not exceed the angular difference between two singularities 8.

When a torque is applied to the rotating shaft with which the sensing element 2 is associated, the ends 3, 4 move in rotation conjointly with the shaft but with an angular offset with respect to one another. Because of this, the coders 5, 6 fixed respectively to the ends 3, 4 move with the same angular offset.

When a first singularity 8a of the first coder 5 is detected by the sensitive elements of the first sensor 10 opposite the rotation pulse track 7b, the said first sensor 10 delivers a signal presenting a first pulse I1.

Then, the sensitive element 2 deforming under the effect of the torque applied, a second singularity 8b of the second coder 6 is detected by the sensitive elements of the second sensor 11 opposite the rotation pulse track 7b, and the said second sensor 11 delivers a second pulse I2.

In one embodiment, the angular difference between the first 8a and the second 8b singularity is determined by the processing device 12 from their angular position.

To do this, the electronic circuits of the sensors 10, 11 make it possible to obtain, from the signals A, B and C, the angular position of the singularities 8 on the rotation pulse track 7b of the corresponding coder 5, 6. An example of obtaining the angular positions from the signals A, B and C is in particular described in the documents FR-2 769 087 and FR-2 769 088 issuing from the applicant.

The processing device 12 has a subtracter of the values of the angular positions of the singularities 8 enabling it to determine the angular difference between the singularities 8a and 8b of the first 5 and second 6 coder.

In another embodiment, the angular difference between the singularities 8a and 8b is measured directly by measuring the separation between the pulses I1 and I2. The electronic circuits of the sensors 10, 11 then comprise means for incremental counting of the edges of the digital signals A, B obtained by interpolation from the pairs of magnetic poles 9 of the coders 5 and 6. The first pulse I1 is then taken as a reference and the separation from the second pulse I2 is determined by counting the number of edges of the signals A, B.

The calibration difference is a difference whose value is constant and peculiar to each determination system 1. This value can be obtained during a learning phase at the exit from the assembly line for the determination system 1.

In the case where the determination system 1 is used for assisted steering, the calibration difference can be measured, on the bench, under zero torque after assembly on the steering shaft. The value of the difference can then be stored by means provided in the processing device 12.

The characteristics of the torsion bar, in particular stiffness, forming the sensing element 2 is stored in these same storage means.

The processing device 12 comprises means of comparing the angular difference measured between the first 8a and second 8b singularity with the angular calibration difference so as to determine, taking account of the stiffness of the torsion bar forming the sensing element 2, the value of the absolute torque applied to the rotating shaft.

In the embodiment depicted, with the use of a coder having 68 pairs of poles 9 and one singularity 8 every pair of poles 9, the maximum angle before determination of the absolute torque and therefore before the triggering of the assistance is close to 5° mechanical. During this phase, the steering is solely manual and the value of the torque measured by the determination system 1 is zero.

As soon as the absolute torque is known, the steering assistance triggers. So as to limit the break in torque which may be felt by the driver at the time of this resumption of assistance, the processing device 12 is able to apply a time ramp in order to pass from the zero value of the torque to the determined absolute torque value.

By choosing in particular the number, the angular difference and the distribution of the singularities 8 but also the stiffness of the sensing element 2, it is possible to adapt the determination system 1 in an appropriate manner to the particular application which is made of it. In particular, it is possible, by appropriate sizing of the determination system 1, to adapt the rise in torque felt by the driver.

In this way, the determination system is sized so that the rise in torque before the determination of the absolute torque value remains below the threshold of sensitivity of the driver. Then, after determination of the absolute torque value, the time ramp makes it possible to have a progressive rise in assistance torque whilst avoiding any jolt which may be felt by the driver. This thereby results in a service which is transparent to the driver.

Moreover, when it is wished also to know the absolute position of the rotating shaft with respect to a fixed structure, it can be envisaged using, conjointly with the determination system 1, a system for measuring the angle of the rotating shaft.

In particular, such a system can be produced in accordance with patent application number FR-03 07002, which combines the measurement of the incremental position of the rotating shaft, which is obtained here by the electronic circuit of the sensors 5 and 6, with a device for measuring the differential speed of the wheels of the front axle. With this embodiment, the invention makes it possible to obtain a module for measuring absolute torque and angle.

In a particular embodiment, the system 1 comprises first and second bearings associated respectively with the first 3 and second 4 end. Each bearing comprises a fixed race, a rotating race associated with the sensing element and rolling bodies disposed between the said races.

It is then possible to provide for at least one coder 5, 6 to be associated with a movable race and/or at least one sensor 10, 11 to be associated with a fixed race. The integration of the measuring device on fixed and movable races is, for example, known from the document FR-2 794 504 issuing from the applicant.

FIG. 3 depicts a module 13 for measuring the torque applied to a rotating shaft, the said module 13 comprising a torque determination system 1 as described above.

The module 13 is intended to be inserted, possibly removably, between two parts of an assembly to which the torque to be measured is applied.

According to a first variant, the module 13 is intended to be integrated between two parts of a shaft, the said shaft having no sensing element.

According to a second variant, the module 13 is intended to be integrated between a shaft and a member applying the torque, the said shaft having no sensing element.

The sensing element 2 is a generally cylindrically-shaped piece of axis 2a. The terms "axial" and "radial" or "transverse" should be understood with respect to planes respectively parallel and perpendicular to the axis 2a.

In the embodiment depicted, the sensing element 2 is in the form of a torsion bar with a circular cross-section intended to be disposed coaxially with the shaft. However, according to the constraints of use, the arrangement of the sensing element 2 and/or the geometry of its cross-section may be designed differently.

A first annular piece 14 extending radially and carrying the first coder 5 on a transverse surface 15 is associated in the vicinity of the first end 3 of the sensing element 2.

The association of the first piece 14 on the sensing element 2 is carried out by means of a first annular support 16 fitted on the end 3 of the sensing element 2.

A second annular piece 17 extending radially and carrying, on its transverse surface 18 opposite to the first coder 5, the second coder 6 is associated in the vicinity of the second end 4 of the sensing element 2.

The association of the second piece 17 on the sensing element 2 is effected by means of a second annular support 19 complementary in shape to the first 16, which is fitted on the end 4 of the sensing element 2.

The first 16 and second 19 supports also comprise association means 20, 21. These means 20, 21 allow the integration of the module 13 with two parts of the rotating shaft or with one part of the rotating shaft and one part of the member applying the torque.

The association means 20, 21 are each formed from an annular piece 22 whose external surface 23 is fluted. The said pieces 22 extend axially respectively on each side of the module 13.

The part of the shaft and/or of the member applying the torque can be fixed respectively to these two fluted annular pieces 22, in particular by force-fitting, so that the assembly thus formed is able on the one hand to transmit the torque and on the other hand to measure it.

The positioning of the second piece 17 with respect to the first 14 is effected by putting the second piece 17 in abutment on a washer 24 disposed in a housing 25 provided in the first piece 14, the said washer 24 being substantially in the same transverse plane as the surface 15 carrying the first coder 5.

The second piece 17 comprises a threaded radial housing 26 intended to receive a screw which, by cooperating with a clamping ring 27, makes it possible on the one hand to fix the second piece 17 rotationally to the sensing element 2 and on the other hand to axially lock the assembly formed by the two pieces 14, 17 carrying the coders 5, 6.

For reasons of compactness, the shape of the two supports 16, 19 is provided with shoulders 28, 29 so that the two coders 5, 6 are substantially in the same axial plane and radially close to one another.

In a variant which is not shown, the two coders 5, 6 can be associated respectively with an end 3, 4 of the sensing element 2.

The sensing element 2 is disposed so as to be able to turn in a fixed sheath 30, for example formed by a hollow tube. The sensors 5, 6 are associated with the sheath 30, for example by snapping on a support 31 carrying them, at an air gap distance respectively from a coder 5, 6 so as to be able to detect radially the field delivered.

The processing device 12 is provided at a distance from the sheath 30, for example at a host computer of the vehicle, in order to deliver a signal proportional to the torque applied.

In the case where the module 13 is associated with a steering shaft, when a torque is applied to the shaft by means of the steering wheel, the sensing element 2, in particular through its geometry and/or through the nature of the material which makes it up, is arranged so as to transmit the rotation movement whilst undergoing elastic torsion under the action of this torque.

From this torsion the result is that the ends 3, 4 of the sensing element 2, and therefore the means which are associated with them, move in rotation conjointly with the shaft but with an angular offset with respect to one another, the offset increasing proportionally to the intensity of the torque.

The geometry and/or the nature of the material making up the sensing element 2 are designed so that, over the entire area of normal use of the steering shaft, on the one hand the torque does not exceed the elastic limit of the material and on the other hand the angular offset of the ends does not exceed the angular difference between two singularities 8.

The determination system 12 then makes it possible to obtain the value of the torque as disclosed above.

The invention claimed is:

1. A system for determining the absolute torque applied to a rotating shaft, said system comprising a sensing element deformable under torsion under the action of the torque applied to the shaft, said system comprises a measuring device comprising:
a first coder and a second coder rotationally fixed, respectively, close to each end of the sensing element, the coders each include at least one singularity equally distributed with an angular difference greater than a maximum deformation value in use of the sensing element, an angular distribution of the at least one singularity is identical on the coders;
a first fixed sensor and a second fixed sensor disposed opposite and at an air gap distance, respectively, from the first coder and the second coder, each of the sensors delivers a signal having a pulse corresponding to a detection of the at least one singularity of the corresponding coder;
wherein said system further comprises a device for processing the signals issuing from the sensors which, after measurement of the at least one singularity on each coder, calculates the angular difference between a plurality of singularities to determine, by comparison with a calibration difference, the absolute torque applied.

2. The system according to claim 1, wherein the coders each comprise a main multipole track and a rotation pulse multipole track which are concentric, the rotation pulse track comprising the at least one singularity equally distributed angularly.

3. The system according to claim 2, wherein the tracks are each formed by a plurality of contiguous poles with a magnetisation direction reversed on a given pole with respect to two poles which are contiguous with the given pole.

4. The system according to claim 3, wherein the rotation pulse track has one singularity for every pair of poles.

5. The system according to any one of claims 2 to 4, wherein the sensors comprise at least three sensitive elements, at least two of which are positioned opposite the main track and deliver two periodic electrical signals in quadrature and at least one of which is positioned opposite the rotation pulse track and delivers an electrical signal.

6. The system according to claim 5, wherein the sensitive elements are chosen from a group including Hall effect sensors, magnetoresistors and giant magnetoresistors.

7. The system according to claim 2, wherein the first and second sensors each comprise an electronic circuit which, from the electrical signals, delivers two square digital position signals in quadrature and a rotation pulse signal in the form of a pulse corresponding to the detection of the at least one singularity.

8. The system according to claim 7, wherein each electronic circuit also comprises an interpolator for increasing a resolution of the digital signals.

9. The system according to claim 7 or 8, wherein the angular position of the at least one singularity on the rotation pulse track of the corresponding coder is obtained, and wherein the processing device includes a subtracter for determining the angular difference between the at least one singularity of each of the first and second coders.

10. The system according to claim 1, further comprising first and second bearings, each bearing comprising a fixed race, a rotating race associated with the sensing element and rolling bodies disposed between the races, at least one of the coders being associated with a movable race and/or at least one of the sensors sensor being associated with a fixed race.

11. A module for measuring the torque applied to a rotating shaft, said module comprising a system according to claim 1 and means for associating said module with, respectively, two parts of the shaft, wherein the shaft is free of a sensing element.

12. A module for measuring the torque applied to a rotating shaft, said module comprising a system according to claim 1 and means for associating said module with, respectively, one end of the shaft and the member applying the torque, wherein the shaft is free of a sensing element.

* * * * *